April 7, 1942.  G. L. TAWNEY  2,279,149
CONVERSION SYSTEM
Filed Nov. 28, 1940   2 Sheets-Sheet 1

WITNESSES:
E. A. McCloskey
D. E. Bartholy

INVENTOR
Gereld L. Tawney.
BY
F. W. Lyle.
ATTORNEY

April 7, 1942.  G. L. TAWNEY  2,279,149
CONVERSION SYSTEM
Filed Nov. 28, 1940  2 Sheets-Sheet 2
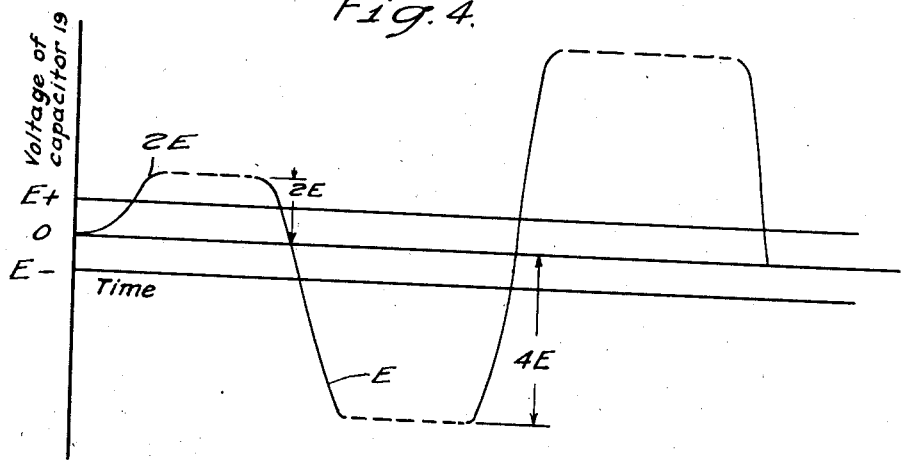
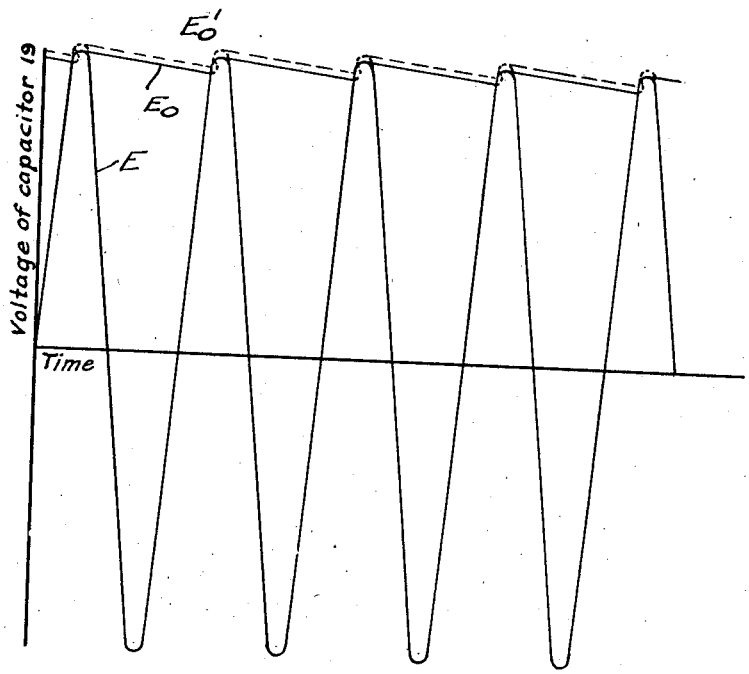
WITNESSES:
INVENTOR
Gereld L. Tawney.
BY
ATTORNEY Patented Apr. 7, 1942

2,279,149

UNITED STATES PATENT OFFICE 2,279,149

CONVERSION SYSTEM

Gereld L. Tawney, Pittsburgh, Pa., assignor to Westinghouse Electric & Manufacturing Company, East Pittsburgh, Pa., a corporation of Pennsylvania Application November 28, 1940, Serial No. 367,624

9 Claims. (Cl. 171—97)

This invention relates broadly to systems and apparatus for the conversion of electrical energy and more particularly, for the transformation of electrical energy from a low voltage direct-current supply source to a higher voltage direct current.

The voltage conversion of direct-current energy finds various applications, and in the prior art a number of systems have been proposed to effect such voltage conversion. Rotating dynamo-electric converters while efficient in operation, are usually cumbersome and large in weight, in comparison with the power output. Other types including those employing a transformer having a vibrating current interrupter in the primary circuit operate with low efficiency. Certain converters utilize the condenser charging principle and employ a number of condensers connected in parallel for charging and in series for discharging. The latter type is costly to manufacture, requiring a large number of component parts in order to obtain sufficient voltage gain, and a complicated switching system necessitates delicate adjustments causing often operating failures.

The present invention departs from the above systems, even in its fundamental concept of operation, in that certain axiomatic properties of an oscillatory circuit are utilized to effect voltage transformation. By an oscillatory circuit is meant here a series circuit including inductance and capacity which when connected to a source of direct current for the duration of one-half cycle of oscillatory current flow exhibits the well known property that the capacity receives a charge which very nearly equals twice the energizing source potential.

A particular feature of this invention is that means are provided for controlling the energization of an oscillatory circuit of the type referred to in such manner that at each energization the charges of the capacitive element of the circuit become cumulative and progressively increasing until reaching a finite value which is limited only by the inherent circuit losses or by the amount of energy diverted to a utilization circuit.

Another feature of this invention is that the control for the energization of the oscillatory circuit is accomplished by a simple switching mechanism which is automatic in operation and may receive actuating power from the source whose voltage is to be converted.

Other features and advantages will be apparent from the following description of the invention, pointed out in particularity by the appended claims, and taken in connection with the accompanying drawings, in which:

Fig. 4 shows the voltage curve of the capacitive element of the circuit of Fig. 1, particularly with respect to the operating time of the non-synchronous switching of the circuit; and Fig. 5 indicates the output voltage wave forms of the two systems shown in Figs. 1 and 2 in the steady state.

The circuits chosen for the illustration of the invention are intended to furnish high voltage for radio or similar apparatus on mobile units, such as cars or air craft. In this field the invention finds particular utility in that the simplicity of the system, the lightness of structure fills a long-sought-for solution to the problem of a power supply giving high voltage direct current from a low voltage storage battery. However, there is no limitation intended by the selection of the above purpose in connection with the description of the invention. Any direct-current source may be used, and the voltage thereof increased to a desired magnitude. The circuit and the principle of operation remain basically the same and only the electrical dimensions of the components need be altered to suit particular conditions.

It may be mentioned here also that the switching device shown in the figures comprises a simple vibrator which finds extensive use at present in direct current voltage conversion systems of the type employing a transformer, as pointed out before. Practice has shown that the vibrator itself is sturdy and durable even in circuits where the primary current of a transformer is interrupted in which a certain amount of sparking at the contacts is unavoidable. In the systems in accordance with the invention, the vibrator can be used even to a greater advantage since no transformer is needed and the contacts of the vibrator open only at times when the current in the circuit to be interrupted is zero. In this manner sparking, which is the main cause limiting the useful life of a vibrator, is eliminated. In certain applications other types of switching devices may be desirable and rotary switches of all types can be used equally well.

Figure 1:
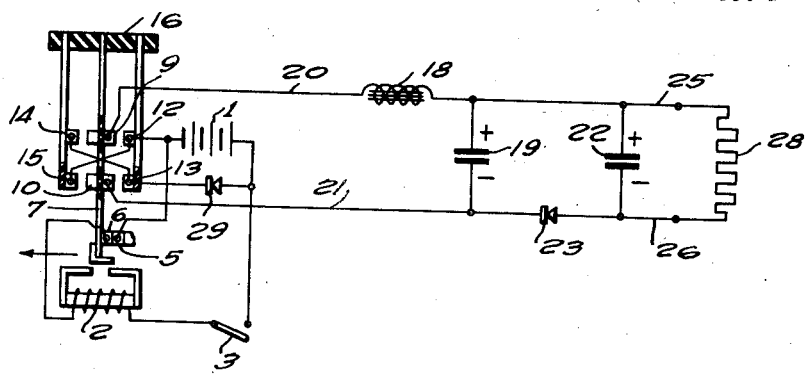
Figure 1 is a schematic circuit arrangement of the invention showing a voltage conversion system employing a non-synchronous type of switching mechanism.

Referring to the drawings, in Figure 1 the voltage source to be transformed is shown by the battery 1, one terminal of which connects to the vibrator actuating coil 2 in series with the switch 3, whereas the other terminal connects to the coil in series with the interrupting contacts 5 and 6 of the armature 7 of the vibrator. When the switch 3 is closed, the current from the battery 1 will traverse the coil 2, the magnetizing force so produced will move the vibrator armature 7 in the direction of the arrow until contacts 6 and 5 separate interrupting the circuit and the armature due to its resiliency is forced to close the contacts 6 and 5 again. The cycle is repeated at a frequency determined by the natural period of vibration of the armature 7. The latter carries also contacts 9 and 10 which cooperate in one position with contactors 12 and 13 and in the other position with contactors 14 and 15, respectively. The armature as well as the contactors are of resilient material mounted on an insulating support 16. Conductors 20 and 21 terminate at contacts 9 and 10 the connections to an oscillatory circuit comprising the inductance 18 and the capacity 19. In parallel with the terminals of the capacity 19 is connected another capacity 22 in series with a rectifier 23. The output of the system may be taken off from the terminals 25 and 26 connected to the capacity 22. By way of example, a resistance 28 connected to the terminals 25 and 26 represents the load to be supplied with high voltage direct current.

Returning to the connection of the battery 1 to the conversion system it is seen that one terminal thereof is connected to contactor 12 and the other terminal in series with a rectifier 29 to the contactor 13. The latter, as well as contactor 12, are cross connected with contactors 14 and 15 so that contactor 12 is joined to 15 and contactor 13 to 14.

Figure 2:
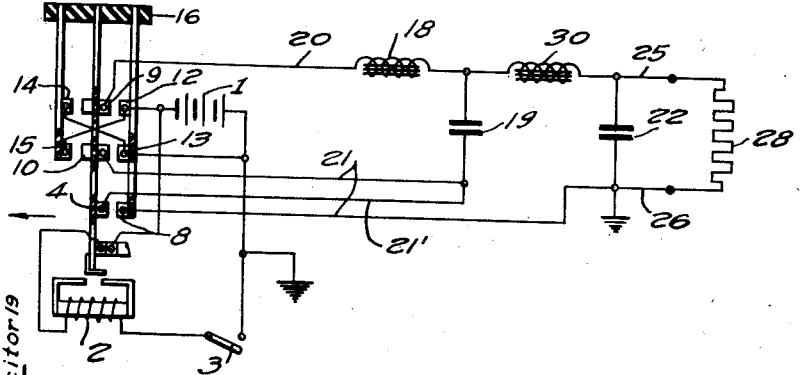
Fig. 2 is a modification of the above, employing a synchronous switching mechanism and a second oscillatory circuit for the transfer of the output voltage to the load.

Referring to Fig. 2, in which identical circuit elements are marked with similar reference characters, as in Fig. 1, the connection of the battery 1 to the energizing coil 2 of the vibrator need not be described again since it is the same as in Fig. 1. The connection and the switching of the oscillatory circuit is identical also in every respect except the rectifier 29 is omitted in the connection between the contactor 13 and the battery 1. Similarly the rectifier in the return circuit of the capacity 22 to the capacity 19 is omitted and in place thereof are two additional contacts 4 and 8 on the vibrator. The contact 4 is carried by the armature and contactor 8 by the member which supports the contactors 12 and 13. The circuit of the capacity 22 includes also an inductance 30 in series between the lead connecting capacity 19 and the capacity 22. By the inclusion of the inductance 30, the capacity 22 in combination therewith forms an oscillating circuit which effectively shunts the capacity 19. The grounding of the conductor 21 and one terminal of the battery is to indicate the condition which is met with in practice where the radio equipment carried by the vehicle is at common ground potential with one terminal of the battery.

Figure 3:
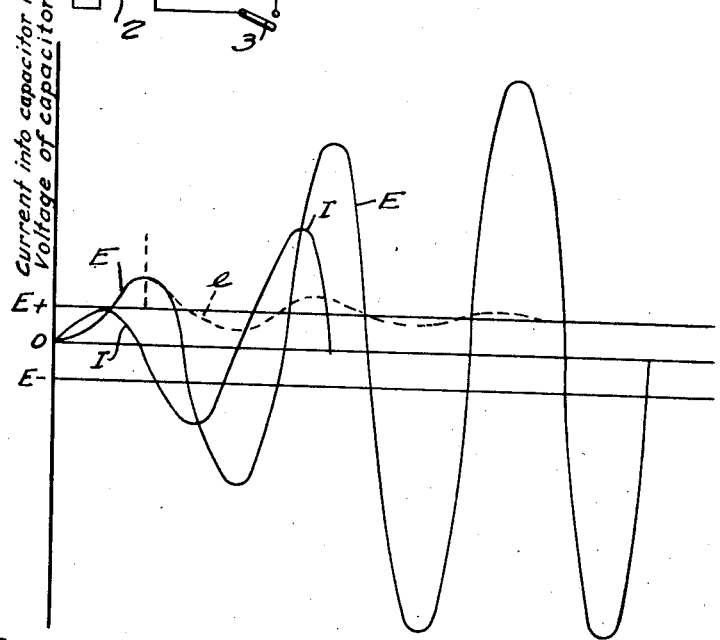
Fig. 3 illustrates by a series of curves the voltage and current relationship in the circuits of Figs. 1 and 2.

In describing the operation of the system, reference may be had to Fig. 3. Let it be assumed that static conditions exist in the circuit and that neither condenser 19 nor condenser 22 will possess any charge. When the switch 3 is closed and the armature is moved in the direction of the arrow to engage contactors 14 and 15, the voltage of the battery will be impressed in series with the oscillatory circuit comprising the inductance 18 and the capacity 19. If the charge on the capacity is zero at time zero, the voltage between terminals of the capacity 19 will rise, as shown by the curve E in Fig. 3 for the half-cycle of current flow shown by curve I, that is, the current increases until the condenser is charged and returns to zero as the condenser 19 becomes fully charged. If the connection of the battery would be maintained in the circuit, the discharge current of the capacity 19 would find a return path, and the resultant oscillatory current would be in a form of a damped sine wave, as shown by the dotted line $e$ in Fig. 3. It is to be noted, that for the half-cycle of current flow, the voltage E rose to approximately twice the value of the battery voltage indicated by the line marked E+. The decay of the oscillation leading to a final voltage of the condenser 19 which equals the battery voltage, as shown by the curve $e$, is due to the resistance of the circuit. The lower this resistance the higher will be the charge of the capacity 19. Theoretically, if the resistance of the circuit is zero, the voltage charge of the capacity 19 would rise to exactly twice that of the battery voltage. Now, if a rectifier is inserted in the circuit, the capacity will charge up to this voltage on the first half-cycle of free oscillation when contactors 14 and 15 engage the contacts 9 and 10. This charge will remain on the capacity 19 since the current cannot reverse to discharge through the battery. The rectifier 29 fulfills this purpose in the arrangement of Fig. 1. The building up of voltage may be continued by reversing the battery 1 and the rectifier 29 and charging the capacity 19 in the opposite direction. This occurs when the armature 7 returns and contacts 9 and 10 engage contactors 12 and 13. Repeating this process alternately at each half-cycle of current flow, the voltage progressively builds up on the capacity 19, as shown in Fig. 3, by the curve E. It can be shown that if the voltage across the capacity 19 is equal to $mE$ at times zero, the maximum voltage obtained by reverse charging with a battery of voltage E when the resistance of the circuit is zero, will be $e_c = (m+2)E$ in a half-cycle of oscillation. If there is no load on the circuit and no losses due to circuit resistance the voltage will build up indefinitely. In fact, since the voltage charge across the capacity 19 is 2E at each closure of vibrator contacts, the charge is 2EC or the charge per cycle is 4EC. If the frequency of vibrator switching is F, then the current output will be $$I = 4EFC$$

In other words, the apparatus performs the function of a constant current generator in which the current is determined by the battery voltage, the frequency of reversals and the capacity of the condenser.

Another advantage of the rectifier 29 in the circuit is that the vibration cycle of the vibrator need not be in synchronism with the frequency of oscillatory charges. This is seen in Fig. 4 in which the curve E shows the charge on the condenser at each half-cycle of current flow and the dotted lines indicate the time during which the vibrator contacts may reverse the circuit to obtain the next charging cycle shown by the portion 4E of the curve. During the time indicated by the dotted lines, the rectifier 29 acts as a circuit interrupter so that the capacity 19 cannot discharge through the battery.

The voltage charge of the capacity 19 is diverted to charge the capacity 22. The rectifier 23 in this circuit permits only charges of like polarity to be impressed on the capacity 22. For example, at each time when the charge of the capacity 19 is such as indicated by the positive and negative signs the capacity 22 receives these charges. At the next half-cycle of current flow when the capacity 19 is charged in the opposite direction, the capacity 22 is not affected due to the rectifier 23 in the circuit and cannot discharge through the system. The voltage to which the capactiy 22 is ultimately charged is the output voltage supplied to the load shown here by the resistor 28. In the circuit of Fig. 1, this voltage is equal in magnitude to the voltage charge of the capacity 19. The progressive increase of this voltage then will depend on the circuit resistance and the resistance offered by the load 28.

The wave form of the output voltage can be observed in Fig. 5 in which the curve E shows the voltages of the capacity 19 at a time when there is no further increase of voltage due to the losses in the circuit and the load. It is seen that the oscillatory voltage cycles have the same amplitudes. The resultant voltage charge on the capacity 22 is indicated by the line $E_0$. The slope of this line is the voltage drop as the load takes a certain amount of current. At each half-cycle of charge on the capacity 19, the transmitted charge on the capacity 22 equalizes this drop by raising the output voltage to the voltage level of the capacity 19. In Fig. 2, as stated before, there is an additional inductance 30 which in combination with the capacity 22 forms another oscillatory circuit. The voltage impulses of like polarity in energizing this circuit produce oscillatory reaction in the same manner as in the main oscillatory circuit of which the condenser 19 is the capacitive element whereby the voltage on the capacity 22 will be greater than the exciting voltage. This is shown in Fig. 5 by the dotted lines rising above the voltage crests. The oscillatory character of this circuit helps in equalizing the output voltage drop, making the output voltage more nearly uniform.

In the circuit of Fig. 2, the omission of the rectifier 29 necessitates that the vibrator contacts should close at the time when the condenser 19 has its optimum charge, that is, in synchronism with the natural frequency of the oscillatory circuit. In practice this can readily be obtained by calculating the values of the oscillatory circuit to the natural frequency of the vibrator. In order to maintain like polarity of charges on the capacity 22 at each half-cycle of vibrator frequency, the circuit between the capacity 22 and the capactiy 19 is interrupted by the contacts 4 and 8. These contacts perform the function of the rectifier 23 of Fig. 1 and interrupt the circuit at each reversal charge of the capacity 19. In this manner, the battery 1 and the output of the converter may have a common connection to ground. When the vibrator armature is in the position whereby the contact 9 engages the contactor 14 and the contact 10, that of 15, the battery is not short-circuited through conductor 21 and 21' to the common ground point, because at that instant the contacts 4 and 8 are open.

In the following certain calculations will readily show that in a practical embodiment the components have electrical dimensions which can easily be obtained and are of comparatively small size to form a light and compact assembly.

In either one of the circuits the natural oscillations must pass through a half-cycle when the vibrator contacts move to reverse the connection of the battery. The switching period of the vibrator, that is the left and right movement of the armature, therefore, is in time equal to a half-cycle of oscillations. Therefore, $$\frac{W_o}{2\pi}=f_o\geq 2f, \text{ or } f\leq\frac{f_o}{2}=\frac{1}{4\pi}\sqrt{LC}$$

Taking the equality sign for computation $$I=4\ EfC=\frac{E}{\pi}\sqrt{\frac{C}{L}}$$

To obtain an approach to a gain of 2E from E as shown in the curve of Fig. 3 consideration must be given to the damping of the wave.

$$e_o=E+(e_{co}-E)e^{-\frac{Rt}{eL}}\left[\cos\ W_oF+\frac{R}{LW}\sin\ W_oF\right]$$

for a half-cycle $$e_c=E+(e_{co}-E)e^{-\frac{\pi R}{2}}\sqrt{\frac{C}{L}}$$

$$e_c=E+(E-e_{co})e^{-\frac{\pi R}{2}}\sqrt{\frac{C}{L}}^{[-1+0]}$$

and if $e_{co}=-mE$ as before $$e_c=E+E(1+m)e^{-\frac{\pi R}{2}}\sqrt{\frac{C}{L}}$$

If $$e^{-\frac{\pi R}{2}}\sqrt{\frac{C}{L}} \text{ is nearly}=1$$

then $e_c=(m+2)E$ as stated before.

From $$\frac{\pi R}{2}\sqrt{\frac{C}{L}}=\frac{\pi^2 IR}{2E}$$

is seen that the IR drop should be much smaller than the applied voltage. In the above calculations $f_o$=natural frequency of the circuit
$I$=the charging current of the capacity 19
$e_c$=the capacity voltage
$e_{co}$=the initial capacity voltage
$E$=the battery voltage
$W_o=2\pi f_o$ Taking values for a pracical system operating from a storage battery E=6 volts, with an output voltage of 200 at .05 ampere load from the above $$\left[\begin{array}{l}\sqrt{\frac{C}{L}}=\frac{.05\pi}{6}=.0262 \\ f_o=2f=200=\frac{1}{2\pi\sqrt{LC}} \\ \text{from which } L=\ .03 \text{ henry} \\ \text{and} \qquad C=20.8 \text{ microfarads}\end{array}\right]$$

If $$e^{-\frac{\pi^2 IR}{2E}}=.8\frac{\pi^2 IR}{2E}=.223$$

or R=2.7 ohms. The value of $$\frac{L}{R}=.0111 \text{ henry per ohms}$$

which is readily obtainable even in an air-core inductance.

When voltage multiplication of such large order is required which circuit component losses or other practical limitations do not permit in one system several may be connected in cascade. In this manner the output voltage of one converter is fed into the next one and is used as the initial starting voltage for the latter, and so on.

What is claimed is:

1. In a system for direct current voltage transformation, an oscillatory circuit and a utilization circuit, means for energizing said oscillatory circuit at alternately succeeding intervals with a unidirectional voltage of constant magnitude, means for preventing current flow in said circuit between intervals of succeeding energization and means for diverting a portion of the current in said circuit at intervals of predetermined energization to said utilization circuit.

2. In a system for direct current voltage transformation, an oscillatory circuit and a utilization circuit, means for energizing said oscillatory circuit at alternately succeeding intervals of polarity reversals from a unidirectional source of constant magnitude, means for preventing current flow in said circuit between said reversals and circuit means for diverting a portion of the current in said circuit at intervals of predetermined energization to said utilization circuit.

3. In a system for direct current voltage transformation, an oscillatory circuit including inductance and capacity in series, a source of direct current of constant potential, means for energizing said circuit from said source for a time period of unidirectional flow of current therein, thereby charging said capacity to a potential higher than that of said source, means for successively discharging said capacity in said circuit in additive relation of current flow from said source at predetermined time intervals of duration of unidirectional current flow in said circuit, and circuit means including a second capacity for diverting a portion of said unidirectional current at certain of said time intervals for successively charging said second capacity.

4. In a conversion system, a source of direct current, means for connecting said source at one polarity to a closed oscillatory circuit including inductance and capacity, means for alternately reversing said connection at zero current instances in said oscillatory circuit whereby said capacity becomes progressively charged to a higher voltage at each polarity reversal, a circuit connected between terminals of said capacity comprising a second oscillatory circuit, means including a unidirectional impedance element for maintaining current flow in said second circuit at intervals of predetermined like polarity charges of said capacity.

5. In a conversion system for raising the potential of a direct current source, a closed oscillatory circuit including as elements an inductance and a capacity in series with said source, switching means for periodically reversing the polarity of said source in said series circuit, a rectifier in the current path of said circuit between said source and said elements whereby current flow in said oscillatory circuit at each periodic reversal is limited to a duration of one half-cycle, whereby the potential gradient of said capacity is periodically increased, means for actuating said switching means at time intervals greater than the time period of said half-cycle of current flow, and circuit means for transferring a portion of the potential charge of said capacity.

6. In a conversion system for raising the potential of a direct current source, a closed oscillatory circuit including as elements an inductance and a capacity in series with said source, switching means for periodically reversing the polarity of said source in said series circuit, a rectifier in the current path of said circuit between said source and said elements whereby current flow in said oscillatory circuit at each periodic reversal is limited to a duration of one half-cycle, whereby the potential gradient of said capacity is periodically increased, means for actuating said switching means at time intervals slightly greater than the time period of said half-cycle of current flow, and circuit means for transferring a portion of the potential charge of said capacity comprising a second capacity and a rectifier in series therewith connected between terminals of said first capacity.

7. In a conversion system for raising the potential of a direct current source, a closed oscillatory circuit including as elements an inductance and a capacity effectively in series with said source, switching means for periodically reversing the polarity of said source in said circuit, actuating means for maintaining said periodic reversals at uniform intervals at each half-cycle of current flow at the instant when current in said oscillatory circuit is substantially zero whereby the potential gradient of said capacity is periodically increased, circuit means for transferring a portion of the potential charge of said capacity comprising a second oscillatory circuit including an inductance and a capacity adapted to be serially connected between terminals of said first capacity, switching means for establishing said connection only at periodic reversals effecting like polarity charges of said first capacity, and a utilization circuit connected between terminals of said second capacity.

8. In a conversion system for raising the potential of a direct current source, a closed oscillatory circuit including as elements an inductance and a capacity effectively in series with said source, switching means for periodically reversing the polarity of said source in said circuit, actuating means for maintaining said periodic reversals at uniform intervals at each half-cycle of current flow at the instant when current in said oscillatory circuit is substantially zero, whereby the potential gradient of said capacity is periodically increased, circuit means for transferring a portion of the potential charge of said capacity comprising a second oscillatory circuit including an inductance and a capacity adapted to be serially connected between terminals of said first capacity, said first mentioned switching means being operable for establishing said connection only at periodic reversals effecting like polarity charges of said first capacity, and a utilization circuit connected between terminals of said second capacity.

9. A system in accordance with claim 8 in which said switching means comprises a vibrator having contact elements for periodically reversing said source, an actuating coil for operating said vibrator from said source and an auxiliary pair of contacts for establishing the connection of said second oscillatory circuit.

GERELD L. TAWNEY.